(12) United States Patent
Newlin

(10) Patent No.: US 10,116,218 B2
(45) Date of Patent: *Oct. 30, 2018

(54) POWER CONVERTER WITH CLAMPING CIRCUIT FOR OVERVOLTAGE PROTECTION

(71) Applicant: Silanna Asia Pte Ltd, Singapore (SG)

(72) Inventor: Trevor M. Newlin, Holly Springs, NC (US)

(73) Assignee: SILANNA ASIA PTE LTD, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,998

(22) Filed: Jul. 17, 2017

(65) Prior Publication Data

US 2018/0062521 A1    Mar. 1, 2018

Related U.S. Application Data

(63) Continuation of application No. 15/251,936, filed on Aug. 30, 2016, now Pat. No. 9,712,061.

(51) Int. Cl.
*H02M 3/158* (2006.01)
*H02M 1/32* (2007.01)

(52) U.S. Cl.
CPC ........... *H02M 3/1588* (2013.01); *H02M 1/32* (2013.01)

(58) Field of Classification Search
CPC ....................................... H02M 3/158–3/1588
See application file for complete search history.

(56) References Cited

U.S. PATENT DOCUMENTS

| 4,727,308 A | 2/1988 | Huljak et al. |
| 5,359,281 A | 10/1994 | Barrow et al. |
| 9,712,061 B1 * | 7/2017 | Newlin ............... H02M 1/32 |
| 2004/0036459 A1 | 2/2004 | Wiktor et al. |
| 2005/0093527 A1 | 5/2005 | Chen |
| 2006/0040201 A1 | 2/2006 | Kurakata |

(Continued)

OTHER PUBLICATIONS

Notice of Allowance dated Mar. 20, 2017 for U.S. Appl. No. 15/251,936.

(Continued)

*Primary Examiner* — Gary L Laxton
*Assistant Examiner* — Peter Novak
(74) *Attorney, Agent, or Firm* — The Mueller Law Office, P.C.

(57) ABSTRACT

Power converters and their methods of operation are described. An example method involves regulating an output using a switching circuit that responds to a control signal. The method involves comparing a feedback voltage from the output to a reference voltage using an error amplifier to create an error voltage, and comparing the error voltage to a ramp voltage from a periodic ramp signal using a comparator to create a PWM signal. The PWM signal is used in combination with the switching circuit to regulate the output. The method involves: clamping the error voltage, using a clamping circuit, if the error voltage drops below a lowest value for the periodic ramp signal while the power converter is regulating a load; and unclamping the error voltage, using the clamping circuit, if the error voltage rises above the lowest value for the periodic ramp signal while the power converter is regulating the load.

19 Claims, 9 Drawing Sheets

(56) References Cited

U.S. PATENT DOCUMENTS

| | | |
|---|---|---|
| 2008/0012542 A1 | 1/2008 | Liu et al. |
| 2009/0039853 A1 | 2/2009 | Omi |
| 2009/0315523 A1 | 12/2009 | Kumagai et al. |
| 2010/0019748 A1 | 1/2010 | Kleine |
| 2012/0268095 A1 | 10/2012 | Wu |
| 2017/0264195 A1* | 9/2017 | Li .......................... H02M 1/36 |

OTHER PUBLICATIONS

Pong et al., Soft Switching Converter with Power Limiting Feature, IEE Proc.-Electr. Power Appl., vol. 146, No. 1, Jan. 1999, pp. 95-102.

Rocha et al., Limiting Internal Supply Voltage Spikes in DC-DC Converters, IEEE International Symposium on Industrial Electronics, Seoul, Korea, Jul. 5-8, 2009, pp. 1060-1065.

* cited by examiner

POWER CONVERTER WITH CLAMPING CIRCUIT FOR OVERVOLTAGE PROTECTION

CROSS-REFERENCE

The present application is a continuation of U.S. patent application Ser. No. 15/251,936, filed Aug. 30, 2016 and entitled "Power Converter Overvoltage System," which is incorporated herein by reference.

BACKGROUND OF THE INVENTION

Electronic devices often need to generate multiple power regimes while only being powered by a single source. For example, a laptop computer may only have a single battery but may need to produce power regimes with different supply voltages for the various components on the laptop. Furthermore, regardless of the need for multiple power regimes, electronic devices often need to condition the power that is delivered to them from an external source. Returning to the example of a laptop, the laptop processor contains sensitive electronics and exhibits a widely varying power demand based on how hard the processor is working. Simply plugging in a DC version of the mains voltage source is not an option because the processor will not be shielded from dips or surges in the power supply and the power supply will likewise not be able to keep pace with the rapid transitions in the power drawn by the processor. The aforementioned requirements are addressed by power converters.

Power converters often operate with feedback loops that adjust the instantaneous performance of the power converter based on the state of the output. As a basic example, the feedback loop can detect when too much or too little power is being delivered from the supply regime to the regulated regime and accordingly decrease or increase the amount of power flowing through the power converter. In certain approaches, this feedback loop will operate in part by comparing a voltage on the output of the power converter with a reference voltage that has a known and unvarying value. The reference voltage is thereby utilized as a measuring stick to determine if the voltage of the regulated regime is remaining constant. Based on the comparison of the reference voltage and the feedback voltage, the control loop can adjust the operation of the power converter to counteract the divergence of the regulated voltage from its desired value.

A particular problem faced by power converters is referred to as an overvoltage condition. In an overvoltage condition, the voltage on the output of the converter rises outside of an acceptable degree of variation around a target voltage. For example, in a power converter designed to provide 5 volts to a regulated regime, variation of greater than 50 millivolts might be considered unacceptable. When an overvoltage condition occurs, the power converter can force itself into a state in which no power is provided from the input of the power converter to the output. However, in certain situations even this response is insufficient. Power converters often use output filters with reactive elements. These reactive elements can store power and continue to deliver that power to the regulated regime even after the power converter has been placed into a state where no additional power is being passed through the power converter. There are various approaches for detecting and responding to an overvoltage condition. Circuits directed to this problem are commonly referred to as overvoltage protection (OVP) circuits.

SUMMARY OF INVENTION

In one approach a method is disclosed. The method includes regulating an output using a switching circuit that responds to a control signal. The method includes comparing a feedback voltage from the output to a reference voltage using an error amplifier to create an error voltage, and comparing the error voltage to a ramp voltage from a periodic ramp signal using a comparator to create a PWM signal. The PWM signal is used in combination with the switching circuit to regulate the output. The method includes: clamping the error voltage, using a clamping circuit, if the error voltage drops below a lowest value for the periodic ramp signal while the power converter is regulating a load; and unclamping the error voltage, using the clamping circuit, if the error voltage rises above the lowest value for the periodic ramp signal while the power converter is regulating the load.

In another approach a method to control a power converter is disclosed. The method includes regulating an output of the power converter using a control signal applied to a power transistor. The control signal has a duty cycle. The method includes comparing a feedback voltage from the output of the power converter with a reference voltage using an amplifier. The amplifier has an amplifier output. The method includes generating an error voltage on the amplifier output using the amplifier. The error voltage is based on the comparison of the feedback voltage and the reference voltage. The method includes comparing the error voltage to a periodic voltage signal using a comparator. The periodic voltage signal has an average value across one period. The method includes generating a PWM signal using the comparator. The PWM signal is based on the comparison of the error voltage and the periodic voltage signal. The duty cycle is based on the PWM signal. The method includes monitoring the error voltage. The method includes clamping the amplifier output, using a clamping circuit, upon a delta between the error voltage and the average value rising above a trigger value.

In another approach a power converter is disclosed. The power converter includes a power transistor regulates an output of the power converter, and receives a control signal on a control node.

The power converter includes an amplifier having a set of amplifier inputs that are independently coupled to a feedback voltage from the output of the power converter, and a reference voltage. The power converter includes a comparator having a set of comparator inputs that are independently coupled to an output of the amplifier, and a periodic voltage signal output from a periodic signal generator. The power converter includes a clamping circuit having a clamping circuit input coupled to the output of the amplifier and a clamping circuit output coupled to the output of the amplifier. The amplifier generates an error voltage on the amplifier output based on the feedback voltage and the reference voltage. The comparator generates a pulse width modulated signal on the comparator output based on the error voltage and the periodic voltage signal. The periodic voltage signal has an average value across one period. The clamping circuit clamps the output of the comparator if a delta between the error voltage and the average value exceeds a trigger value.

The output of the comparator is communicatively coupled to the power transistor. A duty cycle of the control signal is set by the comparator.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Figure 1:
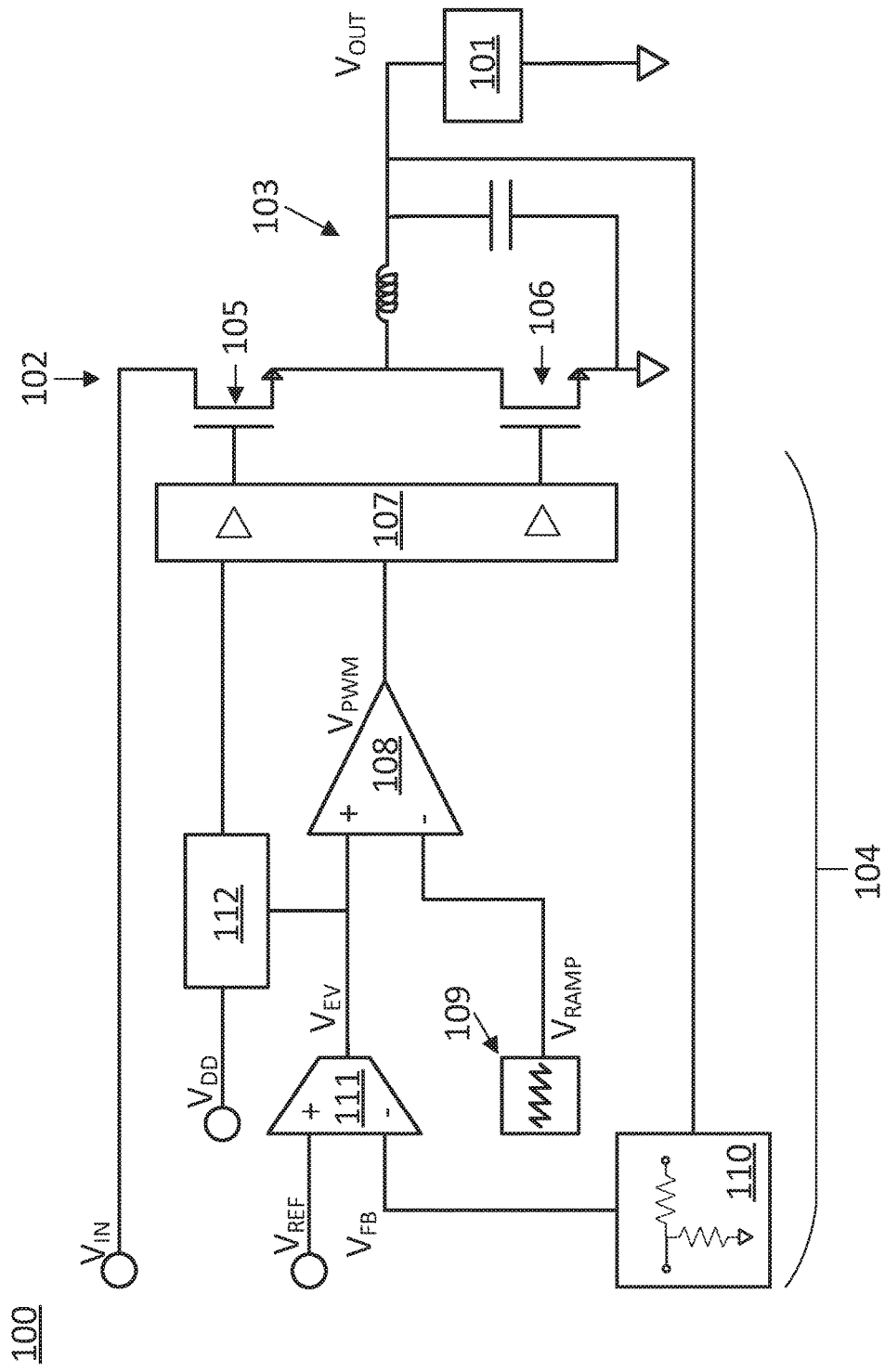
FIG. 1 is a block diagram of a power converter topology utilizing a clamping circuit in accordance with approaches disclosed herein.

FIG. 1 illustrates a power converter topology that utilizes a clamping circuit to efficiently detect an overvoltage condition and to optionally produce a control signal to combat the overvoltage condition. Power converter 100 is a switched mode pulse width modulated (PWM) power converter in buck configuration (i.e., $V_{IN}$ is greater than $V_{OUT}$). However, power converter 100 is only used as an example and the teachings herein regarding overvoltage detection and remediation are more widely applicable to any power converter topology that utilizes a feedback path with an error voltage including boost, buck-boost, boost-buck, or transformer-based converters.

Power converter 100 includes an input node that receives the input to the power converter from a supply regime at a voltage $V_{IN}$ and provides power to a load 101 in a regulated regime at a regulated voltage $V_{OUT}$. Power converter 100 regulates the output using switching circuit 102, an output filter 103, and a feedback path 104. Generally a power transistor in the switching circuit will regulate the output of the power converter in response to a control signal received on a control node of the power transistor. As illustrated, the power converter includes two n-type field effect transistors (FETs). However, the teachings herein are broadly applicable regardless of what kind of power transistors are utilized in switching circuit 102. In the illustrated configuration, the first FET 105 can be referred to as the control FET and the second FET 106 can be referred to as the synchronous FET. In the case of FET power transistors, the control node is the gate of the FET. Alternative implementations of switching circuit 102 can use a single transistor, and may utilize a diode in place of the synchronous transistor 106.

During standard operation, feedback path 104 takes $V_{OUT}$ as an input, and produces the control signals that are provided to switching circuit 102. In the illustrated situation, these signals would be in the form of voltages applied to the gates of first and second FETs 105 and 106. The feedback path 104 forms part of a closed control loop because the control signals provided to switching circuit 102 serve to regulate $V_{OUT}$. The control loop exhibits negative feedback as it reacts to a change in the output by forcing a countervailing change.

The specific feedback path 104 illustrated in FIG. 1 can be utilized in a PWM power converter. Switching circuit 102 is driven by a driver circuit 107, but the bulk of the control information used by the switching circuit is provided by PWM comparator 108 which is communicatively coupled to the switching circuit 102. In certain approaches, PWM comparator 108 is communicatively coupled to the control node of a power transistor in the switching circuit 102 such as the gate of the first FET 105 and/or the second FET 106. PWM comparator 108 generates a control signal $V_{PWM}$ on the comparator output that is characterized by a duty cycle. The duty cycle of the control signal is set by the comparator. The control signal can be a pulse width modulated signal in the form of a voltage $V_{PWM}$.

The duty cycle of $V_{PWM}$ is set by the relative magnitude of an error voltage $V_{EV}$ to a periodic voltage signal generated by a periodic signal generator. In this case, the periodic signal is in the form of a periodic ramp voltage $V_{RAMP}$ generated by periodic signal generator 109. As illustrated, PWM comparator 108 has a set of comparator inputs that are independently coupled to an output of amplifier 111 and a periodic signal output from periodic signal generator 109. The output of amplifier 111 is coupled to the noninverting input of PWM comparator 108. The output of amplifier 111 is coupled to the inverting input of PWM comparator 108. The duty cycle of $V_{PWM}$ determines the relative length of times for which an individual switch, or switches, in the switching circuit are conducting or non-conducting. Those relative lengths of time in turn determine the amount of power transferred from the input of the power converter to the output of the power converter.

Feedback path 104 adjusts the amount of power transferred from the input of the power converter to the output of the power converter based on a measurement of the output voltage. The adjustment is made using a reference voltage, a feedback voltage, and an amplifier. The amplifier can have a set of amplifier inputs that are coupled to a feedback voltage from the output of the power converter and a reference voltage. The amplifier can generate an error voltage on an output of the amplifier based on the feedback voltage and the reference voltage. As illustrated, the output voltage $V_{OUT}$ is provided to a voltage divider 110 which produces feedback voltage $V_{FB}$. This feedback voltage $V_{FB}$ is provided to the inverting input of an amplifier 111. A reference voltage $V_{REF}$ is then provided to the noninverting input of amplifier 111. The amplifier generates the error voltage $V_{EV}$ utilized by PWM comparator 108 based on a comparison of these two inputs.

The control loop illustrated by power converter 100 exhibits negative feedback. If $V_{OUT}$ rises outside of a desired range of regulation, $V_{FB}$ will rise in kind, which will cause a commensurate decrease in $V_{EV}$ determined by the gain of amplifier 111. In turn, $V_{EV}$ will be less than $V_{RAMP}$ for a greater proportion of the period of $V_{RAMP}$. Continuing through the loop, this change in the relative magnitudes of $V_{EV}$ and $V_{RAMP}$ will cause the duty cycle of $V_{PWM}$ to decrease. Finally, this decrease in duty cycle will cause transistor 105 to conduct for a shorter amount of time in each switching period, which will lead to a decrease in $V_{OUT}$ to counteract the initial unacceptable rise in $V_{OUT}$ that began the cycle through the loop that was just described.

The illustrated aspects of power converter 100 that are discussed above are provided by way of example. Numerous variations can be made to the illustrated topology while still benefiting from the teachings herein. Alternative approaches for generating $V_{FB}$ exist besides a voltage divider including numerous voltage sensing circuits that are known in the art. The voltage can also be digitized and compared against a digital reference. $V_{REF}$ can be generated externally or internally, using, for example, a bandgap circuit. The reference voltage can be designed to remain constant throughout the operation of the power converter regardless of variations in the supply voltages and temperature of the power converter. Additional measurements may be taken concerning the operating point of the power converter to influence the operation of the control loop. For example, the periodic ramp voltage could depend on the input voltage, and the additional measurements from the output of the power converter such as a measurement of the output filter inductor current could be injected into the control loop. Also, additional circuitry can be included between the illustrated circuit blocks to provide additional functionality or protection from other non-idealities and error modes that have been omitted for simplicity. As such, the use of the term communicatively coupled is meant to account for these additional circuits. For example, error amplifier 111 would be considered communicatively coupled to the noninverting input of comparator 108 regardless of whether or not additional circuit blocks were added between those blocks in the figure so long as the information carried by voltage $V_{EV}$ was still transmitted to comparator 108 in at least one operating mode of the power converter.

The performance of control loop 104 described previously depends on the device maintaining itself in a certain range of operation. For example, the gain of amplifier 111 has to be properly calibrated and maintained to assure that the loop remains stable. As another example, the frequency of the periodic signal has to be such that variations in its duty cycle can be detected by the control loop. Furthermore, the error voltage $V_{EV}$ should remain within the maximum and minimum values of the periodic signal generator 109. If $V_{EV}$ strays too far outside of this range, the power converter will perform inefficiently. Once $V_{EV}$ decreases below the minimum value of the periodic signal generator the output of the comparator $V_{PWM}$ will be locked at zero and the switching circuit 102 will be off. Although this is the correct response to such an error signal, the loop control will no longer be linear because a further decrease in the error voltage will not have any effect on the system. This is problematic because an overvoltage condition will tend to drive $V_{EV}$ out of the linear range of the control loop's operation and the effective strength of the negative feedback of the control loop will not increase in step with the severity of the overvoltage condition. Furthermore, if the error voltage drops significantly lower than $V_{RAMP}$ due to a temporary glitch or shutdown in the system, time will be wasted when the device returns to a standard operating mode as amplifier 111 will need to drive $V_{EV}$ back up into the acceptable range before standard regulation can begin again.

Figure 2:
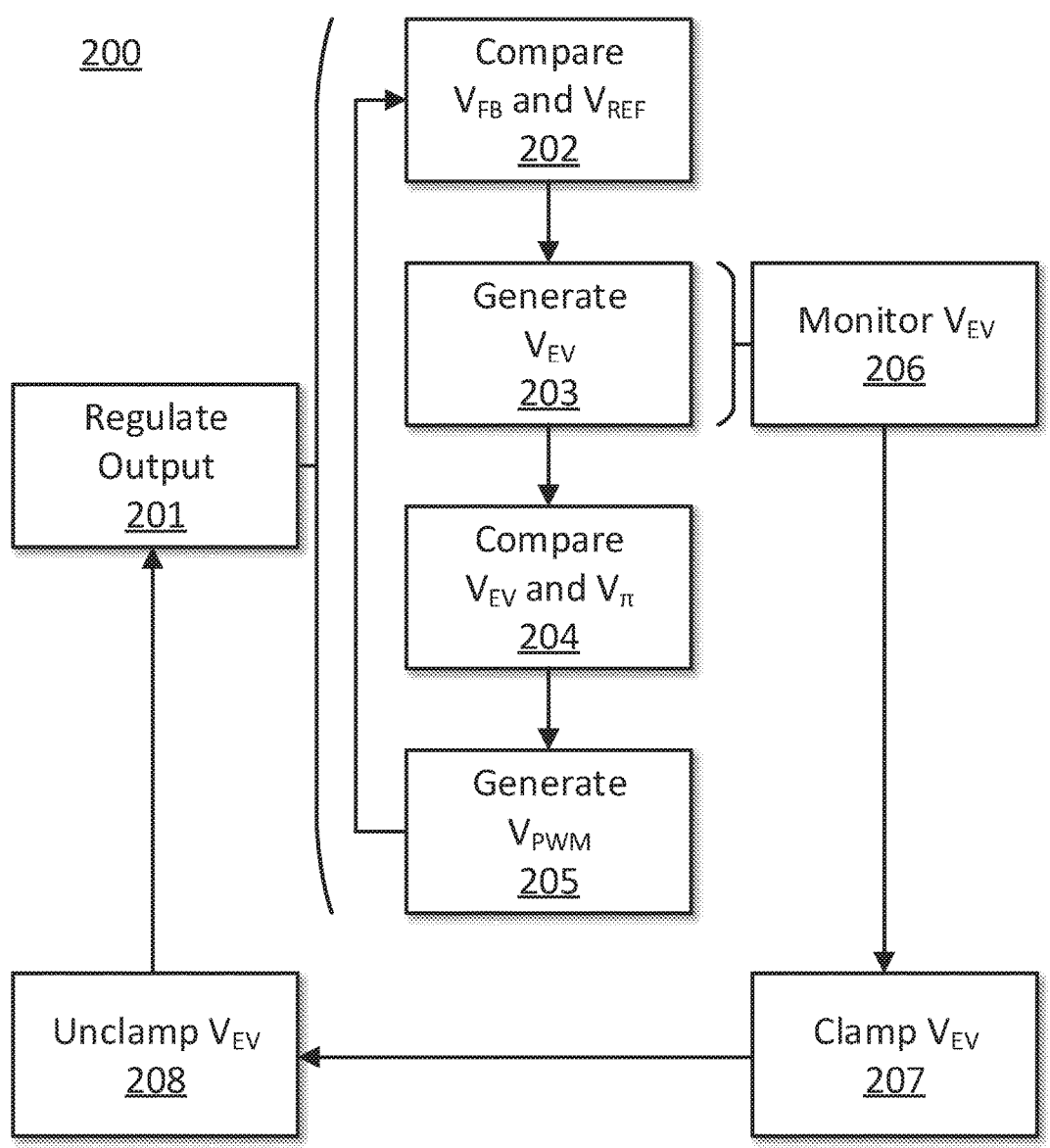
FIG. 2 is a flow chart for a set of methods of operating a power converter in accordance with approaches disclosed herein.
Figure 3:
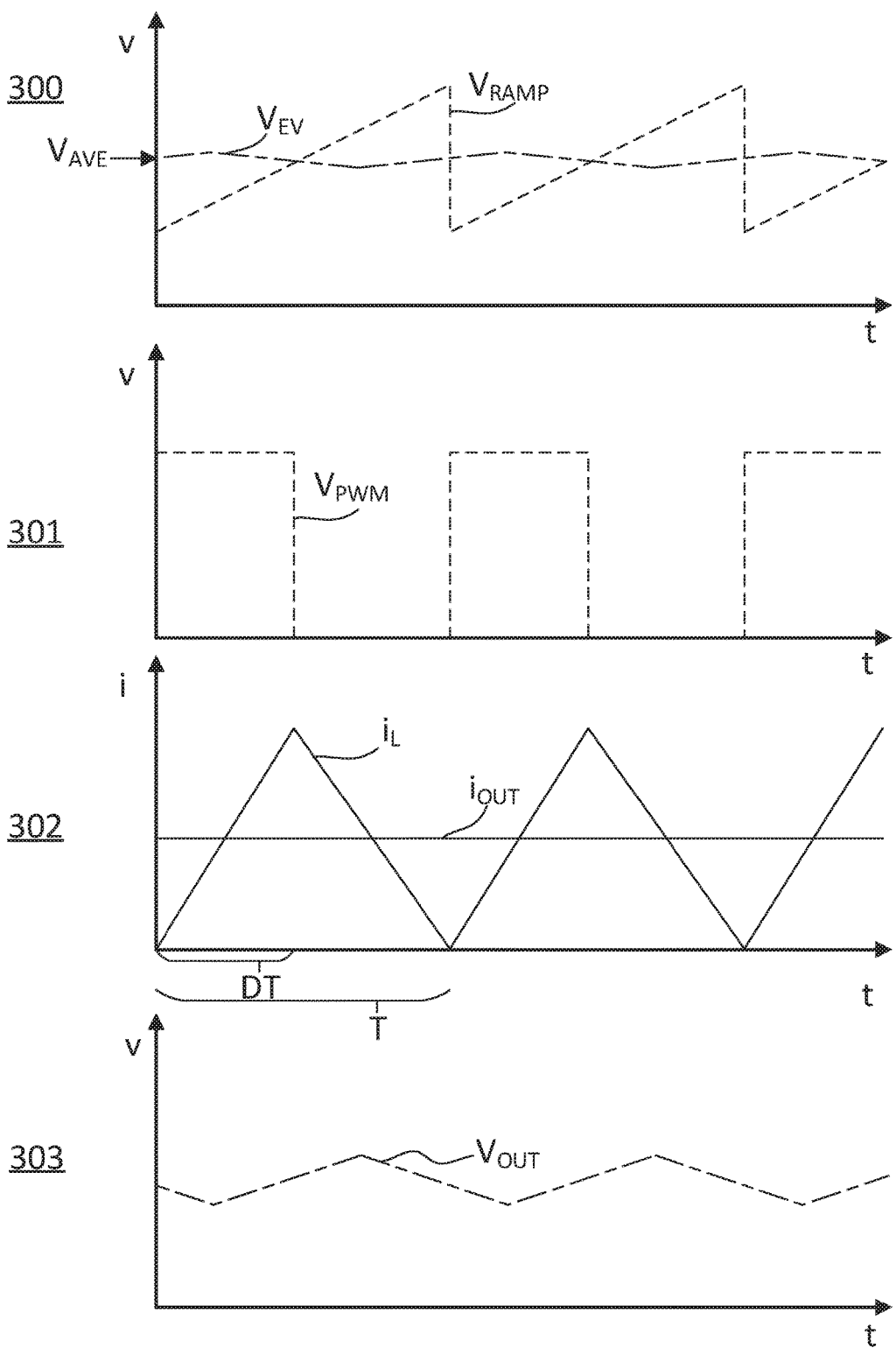
FIG. 3 is a set of waveforms illustrating the operation of a power converter in accordance with approaches disclosed herein.

A circuit and method for alleviating the effect of a transition out of a standard operating mode in the power converter can be described with reference to FIGS. 1-3. The transition out of the standard operating mode could be an uncontrolled transition caused by an overvoltage condition. FIG. 1 illustrates a power converter that has been augmented to detect and alleviate the effect of such a transition. This augmentation includes the addition of a clamping circuit 112. The clamping circuit could have both a clamping circuit input and a clamping circuit output coupled to the output of the error amplifier. Alternatively, the output could be coupled to the driver circuit 107. As illustrated, clamping circuit 112 receives a power supply $V_{DD}$. The clamping circuit could detect an overvoltage condition on the error voltage node $V_{EV}$ and could place driver circuit 107 in a tristate when the overvoltage condition was detected. FIG. 2 illustrates a flow chart 200 of a set of methods for detecting a transition out of the standard operating mode of the power converter and a reaction to that transition by the clamping circuit. FIG. 3 illustrates a set of waveforms to aide in describing the response of the power converter when executing the methods of FIG. 2.

FIG. 2 includes several steps associated with a set of methods for controlling a power converter. In step 201, a switching circuit responds to a control signal and thereby regulates an output of the power converter. The switching circuit could be switching circuit 102 in FIG. 1 and the control signal could be the signal applied to the gate of a transistor in the switching circuit. Steps 202-205 in flow chart 200 are set off by a bracket connected to step 201. This is meant to indicate that steps 202-205 are occurring continuously while the output of the power converter is regulated in a standard operating mode. Step 206 is likewise conducted while the device is regulated in the standard operating mode, but flow chart 200 also includes a link from step 206 to step 207 in which the output is no longer regulated in a standard operating mode. In step 207, a clamp circuit activates and serves to counteract the effect of an uncontrolled variation from the standard operating mode. This uncontrolled variation could be an overvoltage condition.

Steps 202 and 203 are two steps that can be executed by an amplifier. The amplifier could be a transconductance amplifier with a gain set by the requirements of the control loop in the standard operating mode of the power converter. The amplifier could be amplifier 111 in FIG. 1. In step 202, the amplifier could compare a feedback voltage from the output of the power converter with a reference voltage using an amplifier. The reference voltage could be $V_{REF}$ and the feedback voltage could be $V_{FB}$ as they are described above. In step 203, the amplifier could generate an error voltage on an output of the amplifier that is based on the comparison of the reference voltage and feedback voltage. The error voltage could be $V_{EV}$ as it is described above.

Steps 204 and 205 are two steps that can be executed by a PWM comparator. The PWM comparator could be comparator 108 in FIG. 1. In step 204, the PWM comparator could compare an error voltage with a periodic voltage signal. The error voltage could be a signal indicative of a deviation in the output of the power converter from a desired value. The error voltage could be $V_{EV}$. The periodic voltage signal could be a ramp signal. The periodic voltage signal could be $V_{RAMP}$ from FIG. 1. The periodic voltage signal could have an average value across one period. In step 205, the PWM comparator could generate a pulse width modulated signal on an output of the PWM comparator. The pulse width modulated signal could be based on the comparison of the error voltage and the periodic voltage signal.

FIG. 3 can be used to describe the operation of power converter 100 executing step 201. The abscissa of axes 300, 301, 302, and 303 are in units of time and are aligned with each other across the sets of axes. The ordinate of axes 300, 301, and 303 are in units of volts. The ordinate of axes 302 is in units of amps. Axes 300 illustrates $V_{RAMP}$ and $V_{EV}$. Axes 301 illustrates $V_{PWM}$. When $V_{EV}$ is less than $V_{RAMP}$, $V_{PWM}$ goes to its low value. When $V_{EV}$ is greater than $V_{RAMP}$, $V_{PWM}$ goes to its high value. The ramp voltage rises across a period of the periodic signal T and exhibits an average voltage $V_{AVE}$ across this period. The duration of each period in which the $V_{PWM}$ signal is high is DT. Axes 302 illustrates the output current $i_{out}$, which is the current delivered to load 101, along with the inductor current $i_L$, which is the current through the inductor of output filter 103. The load is drawing a constant current throughout the period of time illustrated. Axes 303 illustrates the output voltage $V_{OUT}$ which is regulated but has a minor ripple owing to the switching of the power converter.

Step 206 of FIG. 2 involves monitoring the error voltage of the control loop. This error voltage could be $V_{EV}$ in FIG. 1. As the error voltage carries information regarding the output voltage, deviations in the error voltage can be monitored to determine if an overvoltage condition has occurred. This step can be executed by a clamping circuit coupled to the output of the error amplifier. The clamping circuit could be clamping circuit 112 in FIG. 1. Alternatively, this step can be conducted by a separate sensing circuit, and such a sensing circuit could be used to clamp the error amplifier output.

In general, monitoring $V_{EV}$ in step 206 will involve measuring the degree of variance between a midpoint of the periodic signal that is delivered to the PWM comparator and the error voltage. Since the midpoint of the periodic signal could be set by design, this step could involve a greater than or less than evaluation of the voltage on the output of the error amplifier using a known voltage. As stated previously, an excessive variation in the error voltage could be indicative of an overvoltage condition. Step 207 could be executed in response to the excessive variation in the error voltage, by clamping the amplifier output using the clamping circuit. The degree of variation that is considered could be set by a trigger value for a delta between the error voltage and the average value of the periodic signal. The trigger value can be any positive nonzero value. In one example, the value is 300 mV. In one example, step 207 should be executed when the error voltage drops below the lowest value of the periodic signal while the power converter is in the standard operating mode. If the periodic signal were a linear ramp voltage, such a situation would be equivalent to the trigger value being equal to half of the magnitude of variation of the ramp voltage across a single period of the signal.

Figure 4:
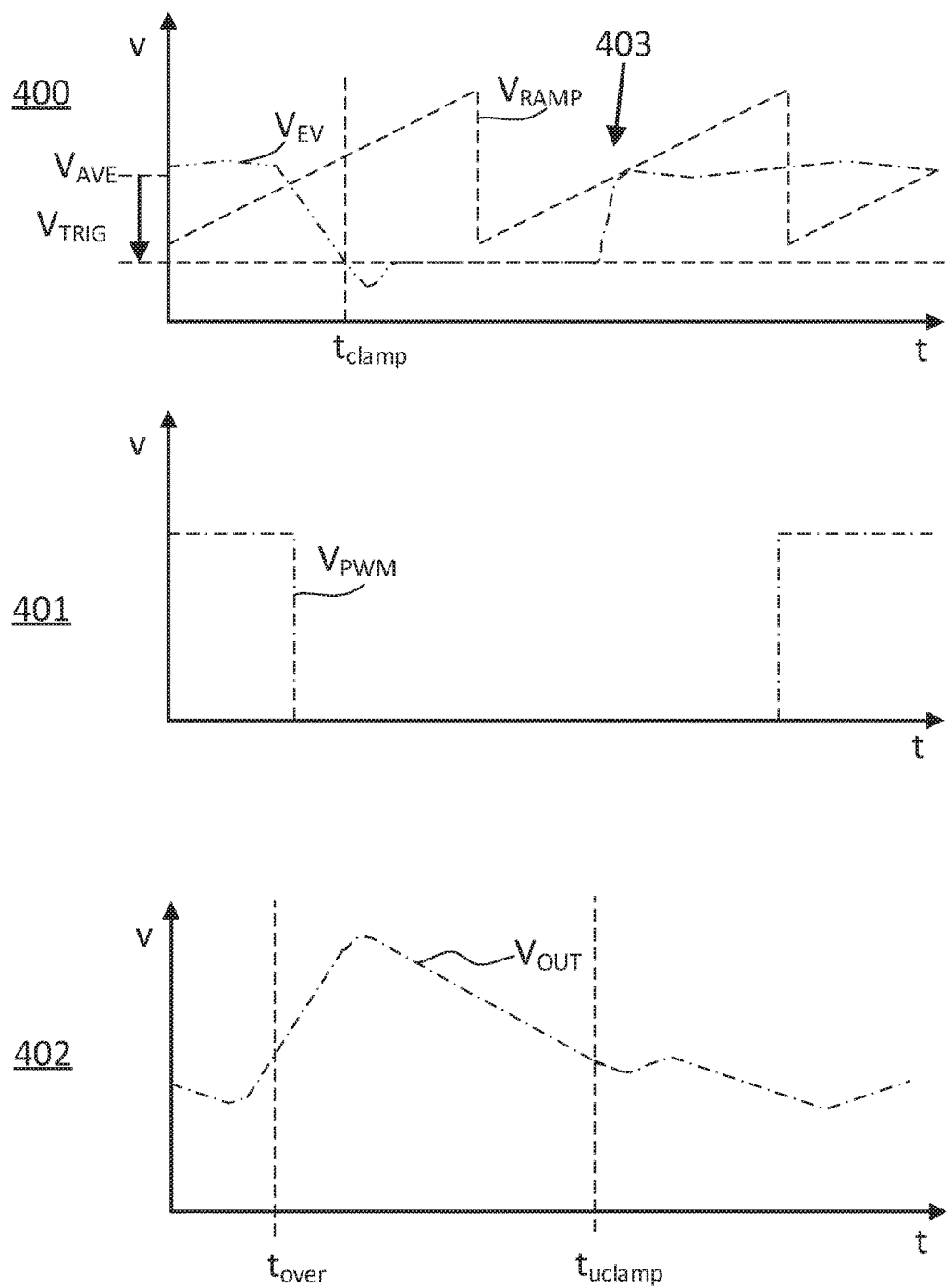
FIG. 4 is a set of waveforms illustrating the operation of a power converter with an overvoltage condition in accordance with approaches disclosed herein.

FIG. 4 illustrates one potential execution of steps 206 and 207 by clamp circuit 112. The abscissa of axes 400, 401, and 402 are in units of time and are aligned with each other across the sets of axes. The ordinate of axes 400, 401, and 403 are in units of volts. Axes 400 illustrates $V_{RAMP}$ and $V_{EV}$. Axes 401 illustrates $V_{PWM}$. Axes 402 illustrates the output voltage $V_{OUT}$. The values charted in FIG. 4 are identical to those of FIG. 3 at the origin of the time axis. As such, $V_{AVE}$ again represents the average voltage of the ramp signal across one period of the signal. The values charted in FIG. 4 begin to diverge at a time t=$t_{over}$. At time $t_{over}$ an exogenous factor causes an overvoltage condition. As seen, the error voltage drops dramatically and $V_{PWM}$ goes low sooner than in FIG. 3. However, either because of an exogenous factor, or excess power in the output filter of the power converter, $V_{OUT}$ continues to rise even after $V_{PWM}$ has dropped to its logic low value. As a result, $V_{EV}$ continues to drop and runs outside the range of values that the ramp voltage varies between.

The value $V_{TRIG}$ marked on axes 400 illustrates the trigger value for the delta between $V_{AVE}$ and the error voltage that serves to initiate clamping of the error voltage. As such, when this delta exceeds $V_{TRIG}$, the error voltage is clamped. In this approach, the error voltage is clamped to a value equal to the voltage it held when the clamp was initiated. However, these values do not need to be identical. With reference back to FIG. 2, the shift from step 206 to 207 begins at time t=$t_{clamp}$ on axes 400. Notably, step 206 could continue to be executed after the shift from step 207 since the clamping circuit may need to determine when it is appropriate to unclamp the error amplifier. Indeed, FIG. 4 also illustrates a return of $V_{OUT}$ to an acceptable range and the unclamping of the error voltage, which is described in more detail below.

Certain benefits accrue to approaches in which the error amplifier is clamped instead of being left to diverge from the range it occupies during standard operation of the load of the power converter. As seen, the error voltage recovers more quickly if it is kept idle at a value that is closer to where it will return when standard regulation state is returned to the power converter. As reference character 403 indicates, the recovery time for returning to standard regulation is set in part by the difference between the error voltage just prior to returning to the standard operational mode and the value the error voltage assumes once standard operation resumes.

As mentioned, clamping circuit 112 can both monitor $V_{EV}$ and clamp the node carrying $V_{EV}$ or it could respond to a control signal from a separate sensing circuit. The clamping circuit can include a second comparator, in addition to the comparator used to generate the pulse width modulated signal for the feedback path, with a set of comparator inputs that are independently coupled to the output of the error amplifier and a second reference voltage. The output of the second comparator will determine the state of the clamping circuit. The second reference voltage will set the trigger voltage for when the clamping circuit will switch states and clamp the output of the error amplifier. The clamping circuit can also include a clamping transistor with a control node coupled to an output of the second comparator, a second node coupled to one of a supply and a ground voltage, and a third node coupled to the output of the amplifier. For example, if the clamping transistor were an n-type FET, the second and third nodes could be the drain and source of the FET and the control node could be a gate of the FET such that the second comparator could control the flow of current through the FET. In these approaches, the clamping circuit would exhibit a clamping state and clamp the output of the error amplifier when a conductive path was created between the second and third nodes through the clamping transistor, and the clamping circuit will unclamp the output of the error amplifier when the conductive path was shut off by the clamping transistor.

The value of the reference voltage applied to the second comparator in the clamping circuit will depend upon what kind of deviation in the error voltage the clamping circuit is meant to prevent. For example, if a deviation towards ground is meant to be prevented, the second reference voltage will be less than the average value of the periodic voltage signal. However, if a deviation towards supply is meant to be prevented, the second reference voltage will be greater than the average value of the periodic voltage signal. As used in this disclosure, the average value of the periodic voltage signal refers to the average value of the periodic signal across one period of the signal. As with the value of the reference voltage, the component parts of the clamping circuit may also need to be adjusted in terms of whether the clamping transistor is a p-type or n-type device and whether the second reference voltage is applied to the inverting or non-inverting terminal of the second amplifier.

Figure 5:
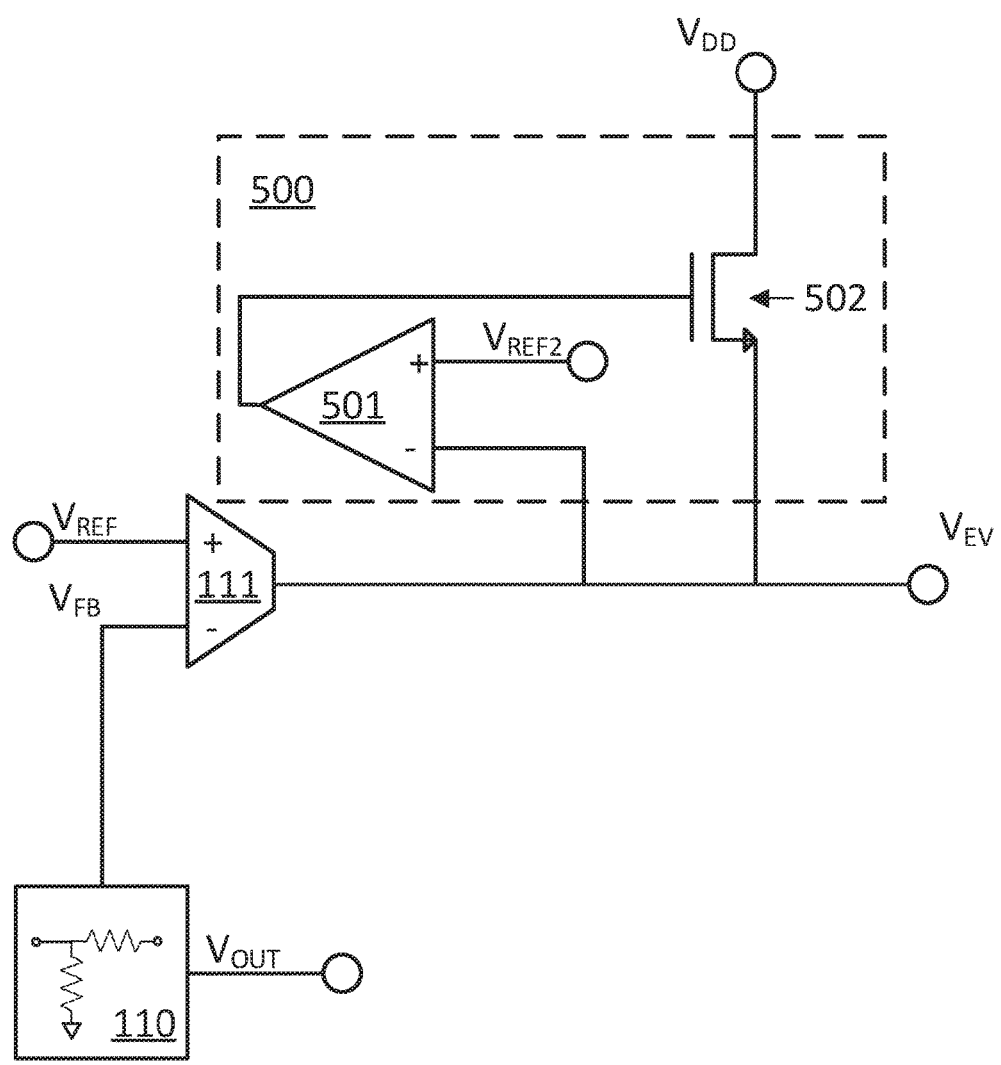
FIG. 5 is a block diagram of a clamping circuit that is in accordance with approaches disclosed herein.

FIG. 5 illustrates a specific implementation of clamping circuit 112 in which the circuit both monitors the voltage on the node to which it is coupled and serves to clamp the node. The circuit can be referred to as clamping circuit 500. Clamping circuit 500 can replace clamping circuit 112. A portion of FIG. 1 is replicated in FIG. 5 to illustrate how the circuits would connect. As shown, the error voltage $V_{EV}$ is generated by error amplifier 111 and the clamping circuit is coupled to the output of the amplifier. Clamping circuit 500 includes a second comparator 501 with a noninverting input connected to a second reference voltage $V_{REF2}$ and an inverting input connected to the output of the error amplifier 111. The clamping circuit 500 also includes an n-type FET 502 with a control gate coupled to the output of second comparator 501. FET 502 conditionally creates a conductive path from $V_{DD}$ to $V_{EV}$ based on the signal sent out from second comparator 501. The voltage $V_{DD}$ could be a supply voltage for the control circuitry of the power converter. It could have a value in the range of 1.8-5 V. When $V_{EV}$ is greater than $V_{REF2}$, the output of second comparator 501 will be low and no conductive path will exist between $V_{DD}$ and transistor 502. However, when $V_{EV}$ is less than $V_{REF2}$, the output of second comparator 501 will be high and a conductive path will exist between $V_{DD}$ and the output of the error amplifier. The conductive path to $V_{DD}$ will serve to increase $V_{EV}$ and thereby cancel out the drive of the comparator. The circuit serves to clamp $V_{EV}$ at $V_{REF2}$ because of this negative feedback.

Figure 6:
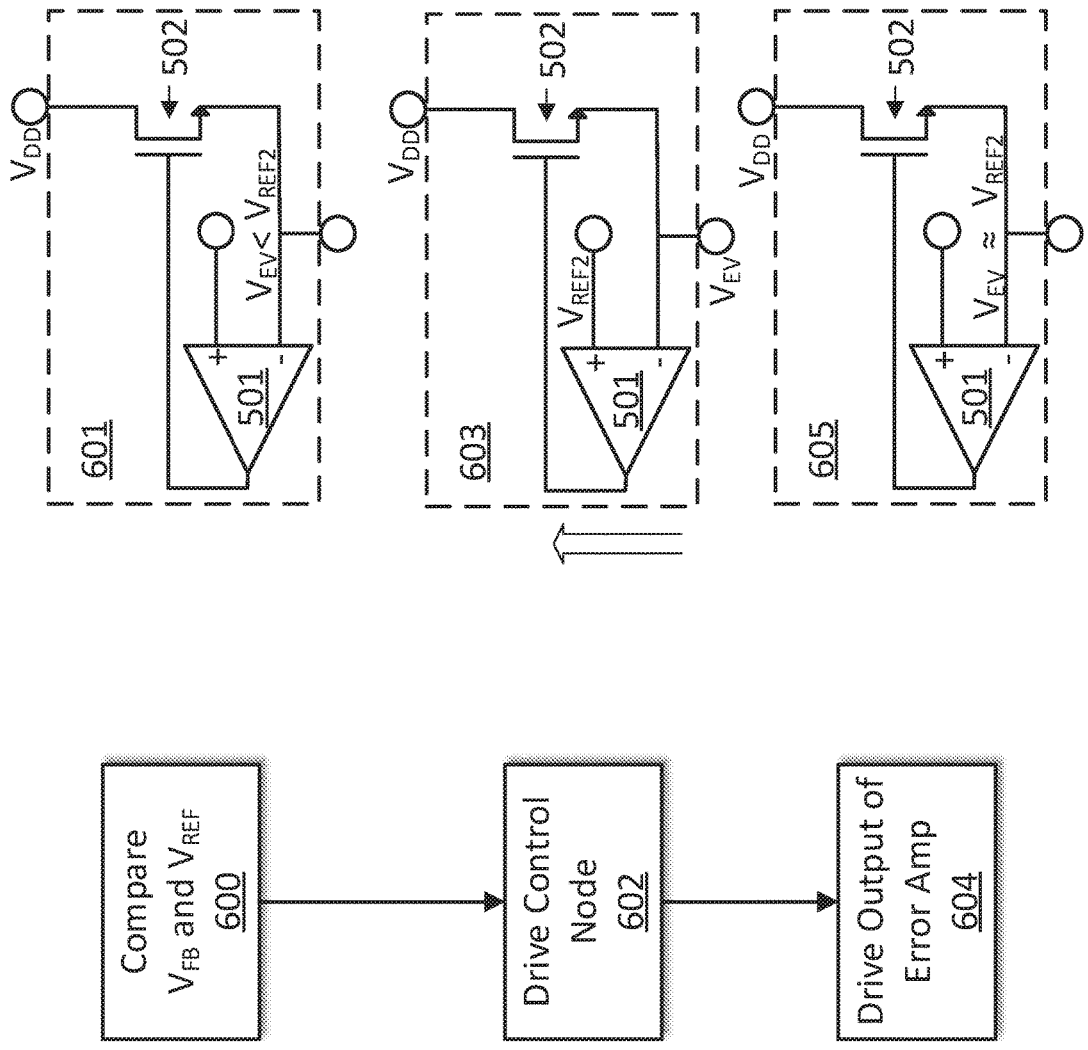
FIG. 6 is a flow chart and accompanying set of annotated circuit block diagrams for a set of methods of operating a power converter in accordance with approaches disclosed herein.

FIG. 6 illustrates a flow chart for a set of methods and a set of states for clamping circuit 500 to describe the action of the clamping circuit. In step 601, the second comparator 501 is used to compare the error voltage $V_{EV}$ with a second reference voltage $V_{REF2}$. The trigger value for the clamping circuit 500 is set by this second reference voltage $V_{REF2}$. When the error voltage dips below the second reference voltage, the method continues to step 602. In step 602, the second comparator 501 drives the control node of clamping transistor 502. This is illustrated in state 603 by an upward arrow showing that comparator 501 increases the voltage on its output and thereby turns transistor 502 on. In step 604, the clamping transistor 502 drives the output of the error amplifier. This occurs in response to the second comparator 501 turning on transistor 502 to create a conductive pathway from $V_{DD}$ to $V_{EV}$. As a result, the voltage on the error amplifier rises up. This is illustrated in state 605 by the error voltage being almost equal to the second reference voltage. The degree to which these values are driven to being equal will depend on the gain of the feedback loop that comprises the second comparator and the clamping transistor.

The clamping circuit can also detect when the output of the error amplifier is no longer outside the desired range and unclamp the output of the error amplifier. As such, the methods of FIG. 2 can also include a step 208 of unclamping the error amplifier output. The step could be conducted when the delta between the error voltage and the average value of the periodic voltage decreased below the trigger value. As another example, the step could be conducted if the error voltage rises back above the lowest value for the periodic ramp signal. Clamping circuit 500 in FIG. 5 provides an example of how the unclamping step could be conducted. Although clamping circuit 500 will clamp the output of error amplifier 111 when the error amplifier is attempting to drive its output below $V_{REF2}$, if the error amplifier begins to drive its output to a value above $V_{REF2}$, the error amplifier will overwhelm the clamping circuit and the voltage will be allowed to rise.

Figure 7:
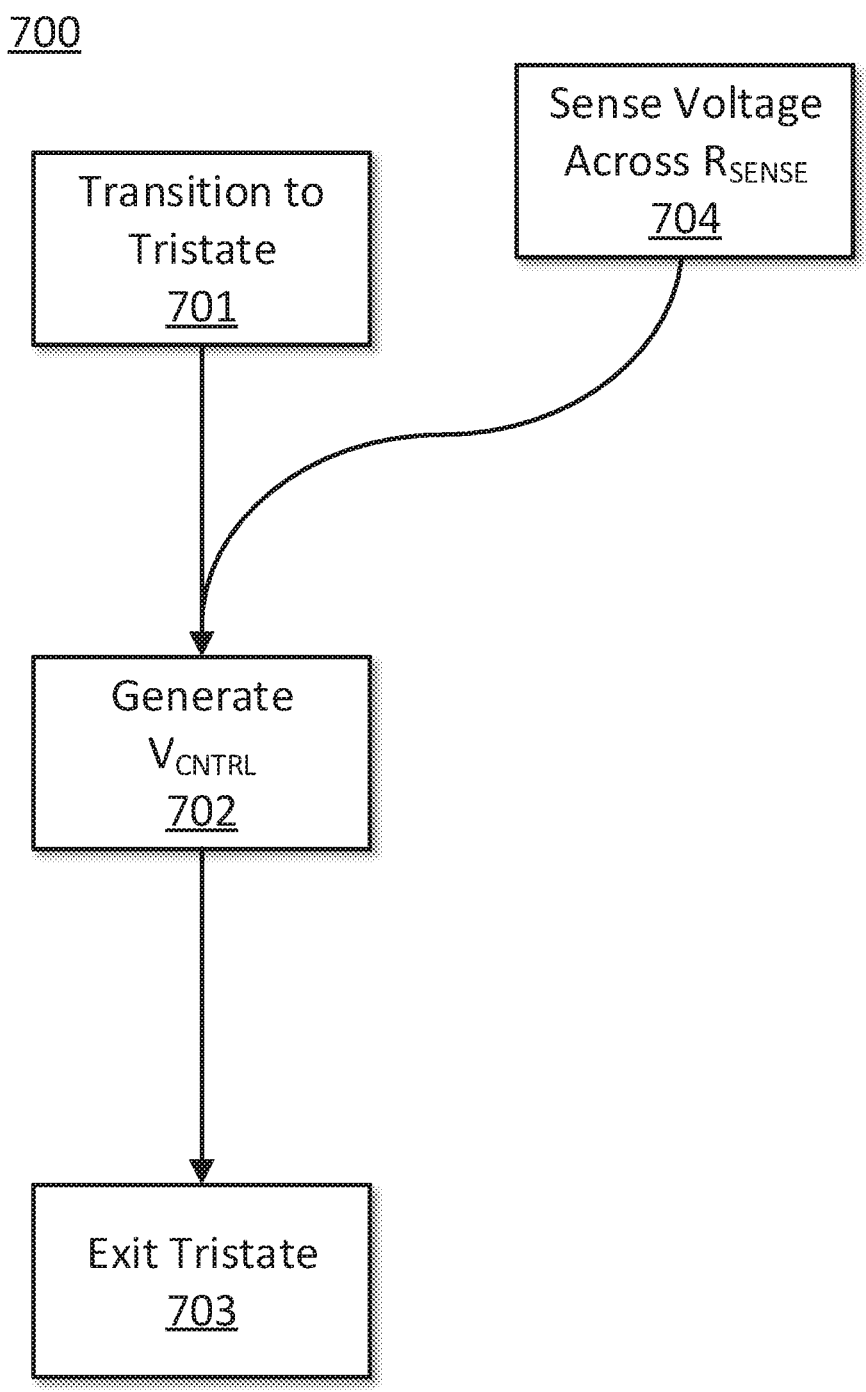
FIG. 7 is a set of waveforms illustrating the operation of a power converter in entering and exiting tristate in accordance with approaches disclosed herein.
Figure 8:
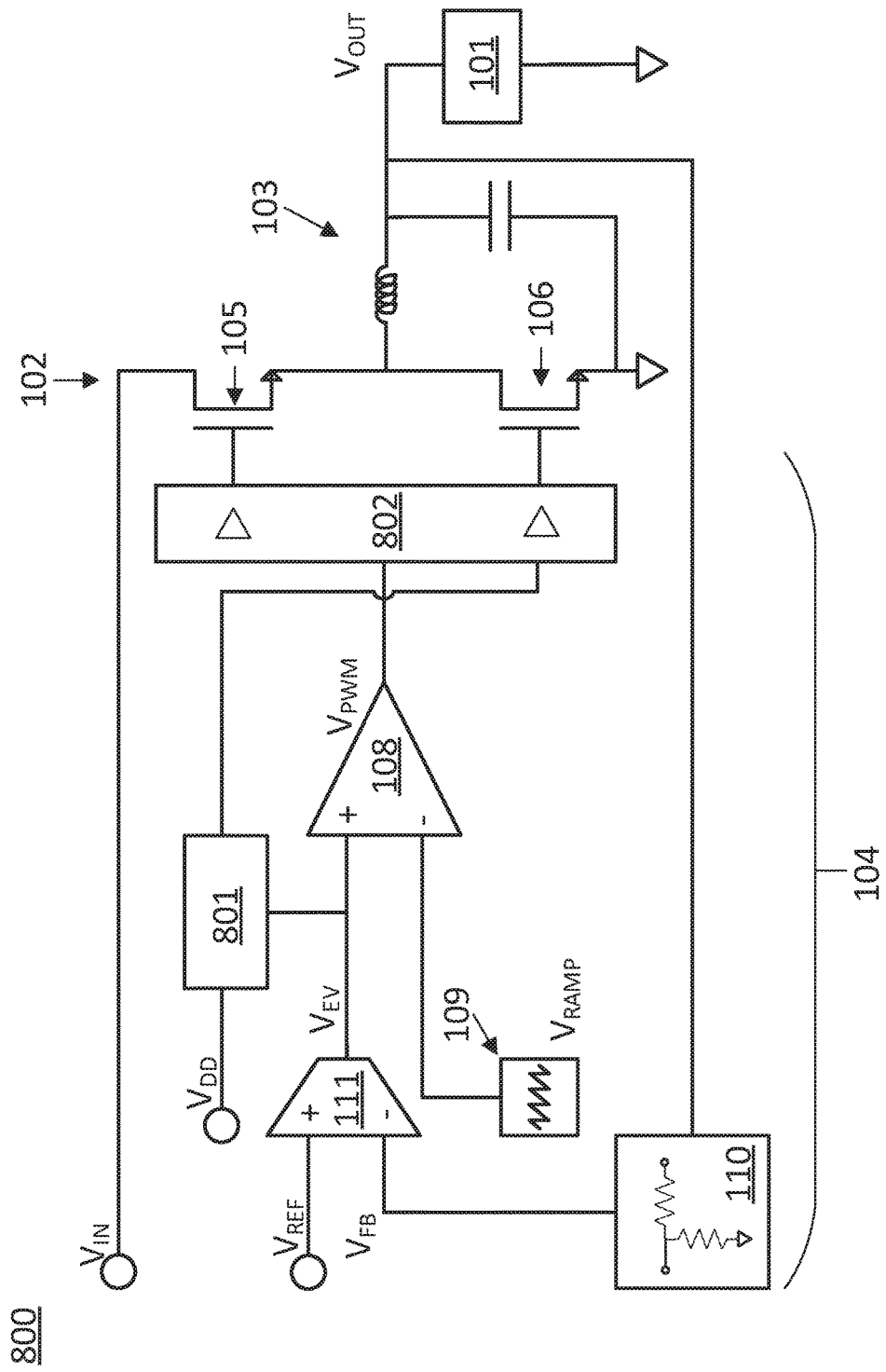
FIG. 8 is a block diagram of a power converter topology utilizing a clamping circuit in accordance with approaches disclosed herein.

In specific approaches, the clamping circuit could also generate and send a control signal to the switching circuit when the clamp activates. In certain power converter topologies, these approaches could exhibit the same beneficial characteristics associated with clamping the error voltage as described above while also serving to alleviate an overvoltage condition. The behavior of these approaches can be described with reference to FIGS. 7-8. FIG. 7 includes a flow chart 700 of a set of methods for controlling a power converter. FIG. 8 includes a block diagram of a power converter 800. Power converter 800 is similar to power convert 100 with the exception that clamping circuit 801 is utilized in place of clamping circuit 112. In addition, power converter 800 utilizes driver circuit 802, instead of driver circuit 107. Driver circuit 802 has an additional input to receive a control signal from clamping circuit 801 and includes additional logic to control the switching circuit based on that control signal. As illustrated, clamping circuit 801 has two outputs, one that is provided to the output of amplifier 111 and a second output that is provided to driver 802.

Flow chart 700 includes a step 701 of transitioning a switching circuit into tristate. In this tristate condition, the output floats. This condition is referred to as tristate in contradistinction to a first state in which the switching circuit couples its output node to the input of the power converter and a second state in which the switching circuit couples its output node to ground. Note that switching circuits with a single switching element will generally not exhibit tristate. With reference to power converters 100 and 800, tristate may occur when both transistors in switching circuit 102 have been shut off. The transistors may both be shutoff when the error voltage has been clamped.

Flow chart 700 continues with step 702 in which a control signal is generated. The control signal could be used to pull switching circuit 102 out of tristate or to otherwise alleviate an overvoltage condition on the output of the power converter. The control signal may be generated by clamping circuit 801. This control signal could be delivered from clamping circuit 801 to driver 802 and could be used to drive a control node of a power transistor in the switching circuit. For example, the control signal could be used to turn on the synchronous FET of a switching circuit regardless of the state of the control signal generated by the PWM comparator. In the illustrated example, the control signal could be used to control the gate of FET 106 to create a conductive pathway from the output of the switching circuit to ground even if the FET would not otherwise be activated based on the action of the main control loop. As such, this particular control signal pulls the switching circuit out of tristate because both of the power transistors are no longer off.

Figure 9:
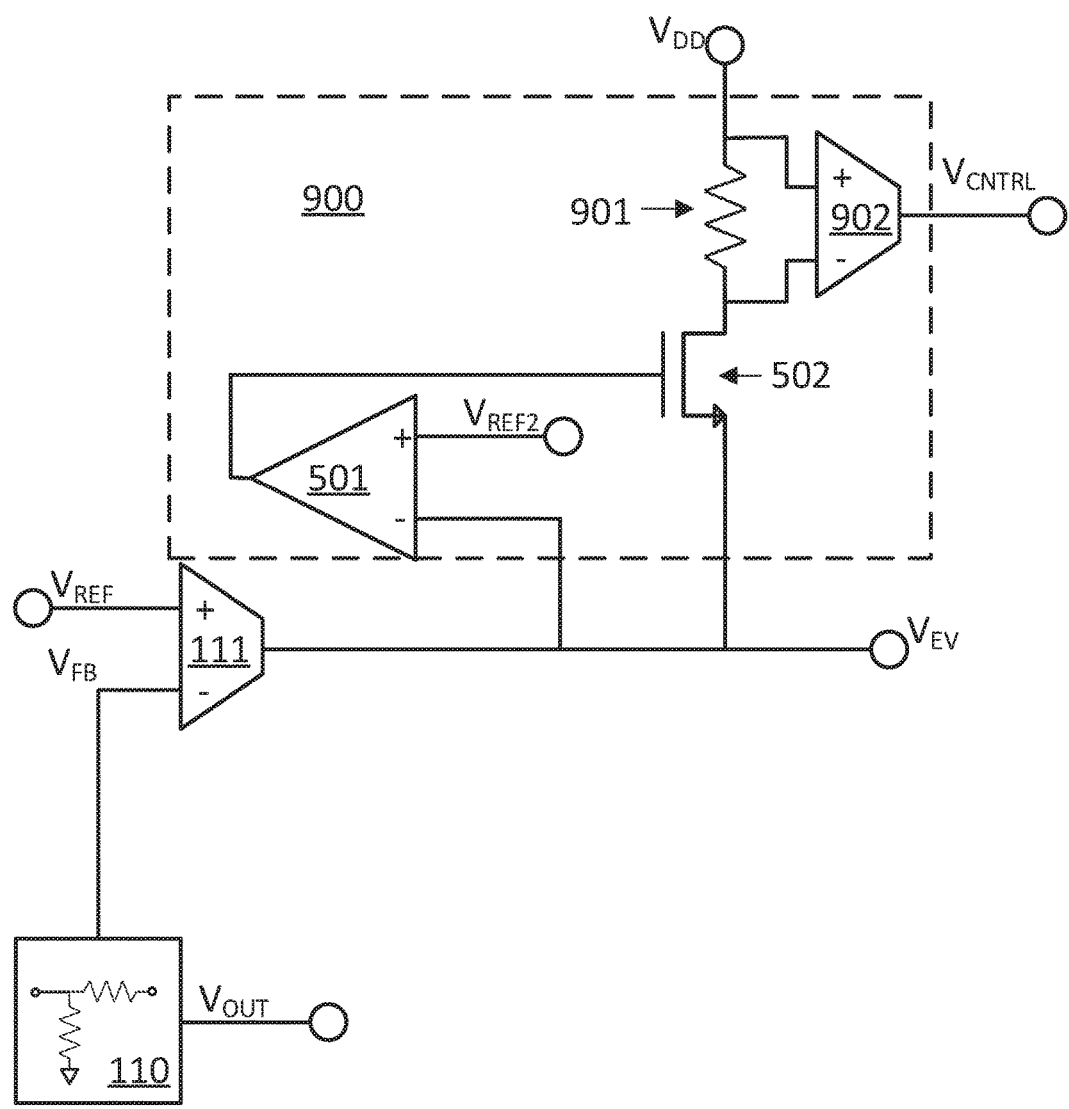
FIG. 9 is a block diagram of a clamping circuit that generates a control signal in accordance with approaches disclosed herein.

The control signal used to alleviate an overvoltage condition could be generated by the clamping circuit when the clamping circuit clamps the error amplifier output. For example, the control signal used to pull the switching circuit out of tristate could be produced when the clamping circuit clamped the error amplifier output. A specific example of such a clamping circuit is provided in FIG. 9. Clamping circuit 900 could be used in place of clamping circuit 801. Portions of FIG. 8 appear in FIG. 9 to illustrate how the circuits could be connected. Clamping circuit 900 generates a control signal $V_{CNTRL}$ on a second clamping circuit output. This signal can be sent to driver circuit 802 to alleviate the overvoltage condition. Clamping circuit 900 includes a sense resistor 901 in series with clamping transistor 502. Sense resistor 901 is coupled between supply voltage $V_{DD}$ and clamping transistor 502. The sense resistor has a first terminal and a second terminal. Clamping circuit 900 also includes a second amplifier 902. The second amplifier has a set of inputs independently coupled to the first terminal and the second terminal of sense resistor 901. The output of the second amplifier is the second clamping circuit output. The signal on the second clamping circuit output $V_{CNTRL}$ is proportional to the current through sense resistor 901. Therefore, when the clamping circuit is activated, the current through transistor increases, which creates an output signal on the output of second amplifier 902.

The combined action of clamping circuit 900 in rectifying an overvoltage condition can be described with reference to additional method steps in FIG. 7 and to the waveforms in FIG. 4. Flow chart 700 could include a step 704 of sensing a voltage across a sense resistor with an amplifier. The sense resistor could be sense resistor 901 and the amplifier could be amplifier 902. Step 704 could be followed by step 702 of generating a control signal with the amplifier based on the voltage across the sense resistor. Step 702 is shown as a product of both steps 704 and 701 because the step of placing the device into tristate could be accompanied by the error voltage decreasing to unacceptable degree and result in the clamping circuit activating to increase the current in the sense resistor. This activation of the clamp circuit would induce a current in sense resistor 901 which would in turn lead to the generation of control signal $V_{CNTRL}$ on the output of amplifier 902 based on the resulting voltage across sense resistor 901.

As shown in FIG. 4, once the error voltage is clamped, the output voltage gradually stops increasing and then gradually decreases back towards its regulated range. This effect could be caused by the fact that the clamping circuit also puts the switching circuit into a state that decreases the output voltage. For example, in addition to the error voltage effectively dropping the duty cycle of the PWM to zero, the clamping circuit could open a conductive path to ground from the output of the switching circuit to pull power out of the output filter and load and direct it to ground. The clamping circuit could be clamping circuit 900 and the generated control signal could turn on the synchronous FET of the switching circuit or could otherwise act to decrease the voltage $V_{OUT}$. Once the output voltage dropped to an acceptable level, the circuit could quickly resume regular operation by unclamping the error voltage as is shown at $t=t_{clamp}$.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. Although examples in the disclosure where directed to switching power converters that provided a fixed voltage to a regulated regime, the same approaches can be applied to power converters that provide a fixed current to a regulated regime. Although overvoltage conditions were used as examples, the teachings herein are more broadly applicable to any deviation in the regulated output or control loop signals from their standard operating condition values. In the provided examples, the polarity of reference, ground, and signal carrying voltages can be switched in whole or in part to achieve similar results. For example, a logic low and logic high could be switched provided an additional inverter was added to the system or provided the entire system switched. Terms that relate to the behavior or characteristic of a power converter being "set by design," and other similar terms, are meant to refer to aspects of the design being determined ex ante by a designer before the part is produced. These terms are meant to distinguish characteristics of the power converter that change while the device is in operation such that they must be treated like variables instead of known values when the device is in operation. These and other modifications and variations to the present invention may be practiced by those skilled in the art, without departing from the scope of the present invention, which is more particularly set forth in the appended claims.

What is claimed is:

1. A method to control a power converter comprising:
   regulating an output using a switching circuit that responds to a first control signal;
   comparing a feedback voltage from the output to a reference voltage using an error amplifier to create an error voltage;
   comparing the error voltage to a ramp voltage from a periodic ramp signal using a comparator to create a pulse width modulated signal, wherein the pulse width modulated signal is used in combination with the switching circuit to regulate the output;
   clamping the error voltage, using a clamping circuit, if the error voltage drops below a lowest value for the periodic ramp signal while the power converter is regulating a load and the switching circuit is not in a tristate;
   unclamping the error voltage, using the clamping circuit, if the error voltage rises above the lowest value for the periodic ramp signal while the power converter is regulating the load and the switching circuit is not in the tristate;
   transitioning the switching circuit into the tristate wherein the output floats; and
   generating a second control signal to pull the switching circuit out of the tristate using the clamping circuit.

2. The method of claim 1, further comprising:
   comparing the error voltage to a second reference voltage using a second comparator;
   wherein the second comparator sets a state of the clamping circuit to unclamped or clamped.

3. The method of claim 1, wherein:
   the second control signal is generated by the clamping circuit when the clamping circuit clamps the error voltage.

4. The method of claim 1, wherein:
   the switching circuit has two or more switches coupled to the load; and all of the two or more switches are shut off when the switching circuit is in the tristate.

5. The method of claim 1, wherein generating the second control signal comprises:
sensing, by an amplifier, a voltage across a sense resistor; and
generating, by the amplifier, the second control signal based on the voltage across the sense resistor;
wherein the clamping circuit induces a current in the sense resistor when clamping the error voltage.

6. A method to control a power converter comprising:
regulating an output of the power converter using a first control signal applied to a power transistor, wherein the first control signal has a duty cycle;
comparing a feedback voltage from the output of the power converter with a reference voltage using an amplifier, wherein the amplifier has an amplifier output;
generating an error voltage on the amplifier output using the amplifier, wherein the error voltage is based on the comparison of the feedback voltage and the reference voltage;
comparing the error voltage to a periodic voltage signal using a comparator, wherein the periodic voltage signal has an average value across one period;
generating a pulse width modulated signal using the comparator, wherein the pulse width modulated signal is based on the comparison of the error voltage and the periodic voltage signal, and wherein the duty cycle is based on the pulse width modulated signal;
monitoring the error voltage;
clamping the amplifier output, using a clamping circuit, upon a delta between the error voltage and the average value rising above a trigger value;
generating a second control signal using the clamping circuit; and
driving a control node of the power transistor using the second control signal.

7. The method of claim 6, further comprising:
unclamping the amplifier output, after clamping the amplifier output, if the delta decreased below the trigger value.

8. The method of claim 6, wherein monitoring the error voltage comprises:
comparing the error voltage to a second reference voltage using a second comparator;
wherein the trigger value is set by the second reference voltage.

9. The method of claim 8, wherein clamping the amplifier output comprises:
driving a control node of a clamping transistor with the second comparator; and
driving the output of the amplifier with the clamping transistor.

10. The method of claim 9, wherein:
the periodic voltage signal is a ramp signal;
the clamping transistor is a field effect transistor;
the control node of the clamping transistor is a gate of the field effect transistor; and
the second reference voltage is less than the average value of the periodic voltage signal.

11. The method of claim 6, wherein generating the second control signal comprises:
sensing a voltage across a sense resistor with a second amplifier; and
generating the second control signal with the second amplifier based on the voltage across the sense resistor;
wherein the clamping circuit induces a current in the sense resistor when clamping the amplifier output; and
wherein the clamping circuit includes a clamping transistor.

12. The method of claim 11, wherein:
clamping the amplifier output comprises (i) driving a control node of the clamping transistor with a second comparator; and (ii) driving the output of the amplifier with the clamping transistor;
the sense resistor is coupled between a supply voltage and the clamping transistor;
the power transistor is a synchronous switch in a switching circuit of the power converter;
the switching circuit includes the synchronous switch and a control switch; and
the second control signal takes the switching circuit out of a tristate.

13. A power converter comprising:
a power transistor that: (i) regulates an output of the power converter; and (ii) receives a first control signal on a control node;
an amplifier having a set of amplifier inputs that are independently coupled to: (i) a feedback voltage from the output of the power converter; and (ii) a reference voltage;
a comparator having a set of comparator inputs that are independently coupled to: (i) an output of the amplifier; and (ii) a periodic voltage signal output from a periodic signal generator; and
a clamping circuit having a clamping circuit input coupled to the output of the amplifier and a clamping circuit output coupled to the output of the amplifier;
wherein the amplifier generates an error voltage on the amplifier output based on the feedback voltage and the reference voltage;
wherein the comparator generates a pulse width modulated signal on a comparator output based on the error voltage and the periodic voltage signal;
wherein the periodic voltage signal has an average value across one period;
wherein the clamping circuit clamps the output of the comparator if a delta between the error voltage and the average value exceeds a trigger value;
wherein the output of the comparator is communicatively coupled to the power transistor;
wherein a duty cycle of the first control signal is set by the comparator;
wherein the clamping circuit generates a second control signal on a second clamping circuit output; and
wherein the second clamping circuit output is communicatively coupled to the control node of the power transistor.

14. The power converter of claim 13, wherein:
the clamping circuit unclamps the output of the amplifier if the delta between the error voltage and the average value decreases below the trigger value.

15. The power converter of claim 13, wherein the clamping circuit comprises:
a second comparator having a second set of comparator inputs that are independently coupled to: (i) the output of the amplifier; and (ii) a second reference voltage;
wherein the output of the second comparator determines a state of the clamping circuit; and
wherein the trigger value is set by the second reference voltage.

16. The power converter of claim 15, wherein the clamping circuit comprises:

a clamping transistor having: (i) a control node coupled to an output of the second comparator; (ii) a second node coupled to one of a supply voltage and a ground voltage; and (iii) a third node coupled to the output of the amplifier;

wherein the clamping circuit clamps the output of the amplifier when a conductive path exists between the second node and third node through the clamping transistor; and wherein the clamping circuit unclamps the output of the amplifier when the conductive path is shut off by the clamping transistor.

17. The power converter of claim 16, wherein:

the periodic signal generator generates a ramp signal;

the clamping transistor is a field effect transistor;

the control node of the clamping transistor is a gate of the field effect transistor; and the second reference voltage is less than the average value of the periodic voltage signal.

18. The power converter of claim 13, wherein the clamping circuit comprises:

a sense resistor having a first terminal and a second terminal; and a second amplifier with a set of inputs independently coupled to: (i) the first terminal; and (ii) the second terminal;

wherein an output of the second amplifier is the second clamping circuit output; and wherein the clamping circuit induces a current in the sense resistor when clamping the amplifier output.

19. The power converter of claim 18, further comprising:

a switching circuit having a synchronous switch and a control switch, wherein the synchronous switch is the power transistor;

a control node of a clamping transistor coupled to an output of the amplifier; and an output of the clamping transistor coupled to the output of the amplifier wherein the sense resistor is coupled between a supply voltage and the clamping transistor; and wherein the second control signal activates the synchronous switch to take the switching circuit out of a tristate.

* * * * *